United States Patent
Nguyen et al.

(10) Patent No.: US 10,145,973 B2
(45) Date of Patent: Dec. 4, 2018

(54) METHOD AND SYSTEM FOR GRADATIONAL SEISMIC VOLUME CLASSIFICATION

(71) Applicant: LANDMARK GRAPHICS CORPORATION, Houston, TX (US)

(72) Inventors: Nam X. Nguyen, Katy, TX (US); Eugene C. Heinrichs, Calgary (CA); Jocelyn Chan, Calgary (CA)

(73) Assignee: Landmark Graphics Corporation, Houston, TX (US)

( * ) Notice: Subject to any disclaimer, the term of this patent is extended or adjusted under 35 U.S.C. 154(b) by 80 days.

(21) Appl. No.: 15/035,481

(22) PCT Filed: Nov. 27, 2013

(86) PCT No.: PCT/US2013/072332
§ 371 (c)(1),
(2) Date: May 9, 2016

(87) PCT Pub. No.: WO2015/080739
PCT Pub. Date: Jun. 4, 2015

(65) Prior Publication Data
US 2016/0291182 A1    Oct. 6, 2016

(51) Int. Cl.
*G01V 1/38* (2006.01)
*G01V 1/30* (2006.01)

(52) U.S. Cl.
CPC ............. *G01V 1/307* (2013.01); *G01V 1/38* (2013.01); *G01V 2210/632* (2013.01)

(58) Field of Classification Search
CPC ................................. G01V 1/38; G01V 1/307
See application file for complete search history.

(56) References Cited

U.S. PATENT DOCUMENTS

| | | | |
|---|---|---|---|
| 5,839,090 A | 11/1998 | Zoraster | |
| 6,954,403 B2 | 10/2005 | Neff et al. | |
| 7,095,677 B2 | 8/2006 | Canning | |
| 2011/0002194 A1* | 1/2011 | Imhof | G01V 1/32 367/53 |
| 2013/0201794 A1 | 8/2013 | Masters et al. | |

OTHER PUBLICATIONS

Examiner Letter for Canadian Application No. 2926205 dated Jan. 26, 2017.

(Continued)

*Primary Examiner* — Bryan Bui
(74) *Attorney, Agent, or Firm* — Locke Lord LLP

(57) ABSTRACT

Embodiments of the invention provide a method for classifying seismic attributes, including generating data points by cross plotting seismic attributes from a first data volume and a second data volume, encompassing at least one of the generated data points within a polygon, generating a reference line, determining an interpolation direction relative to the reference line, and assigning an attribute value to the at least one generated data point encompassed within the polygon wherein the assigned attribute value is interpolated based on the combination of its position to the reference line along the interpolation direction and the shape of the polygon.

18 Claims, 6 Drawing Sheets

(56) References Cited

OTHER PUBLICATIONS

International Preliminary Report on Patentability for PCT International Application No. PCT/US2013/072322 dated May 31, 2016.
Copenheaver, PCT Search Report for PCT Application No. PCT/US2013/072332 dated Apr. 15, 2014.
Copenheaver, PCT Written Opinion for PCT Application No. PCT/US2013/072332 dated Apr. 15, 2014.
Joseph K. Berry. Contour Lines versus Color Gradients for Displaying Spatial Information. In Beyond Mapping IV, published in GeoWorld November Retrieved from the Internet: <URL: http://www.innovativegis.com/basis/BeyondMappingSeries/ BeyondMapping_IV/TopicI/BM_IVTI.pdf>.
Ghali S. Geometry-Free Polygon Splitting Aug. 2011. [retrieved on Apr. 25, 2014] Retrieved from the Internet: <URL: http://2011.cccg.ca/PDFschedule/papers/paper84.pdff>. entire document.

\* cited by examiner

METHOD AND SYSTEM FOR GRADATIONAL SEISMIC VOLUME CLASSIFICATION

FIELD OF INVENTION

The embodiments disclosed herein relate generally to methods and systems for seismic surveying.

BACKGROUND OF INVENTION

Seismic surveys are used in the oil and gas industry for exploring the subsurface geology of the earth. Seismic waves are generated that travel below the surface of the earth, reflect off subterranean structures and return to the surface where they are detected by sensors. Data from the sensors is then used to determine the location of various subsurface features that may trap oil, such as faults or folds in the rock.

The data from the sensors is processed to produce 3D volume data sets of seismic traces. The volumes include a seismic attribute value at specified (x, y, z) locations within a geographic space. A seismic attribute is a quantity extracted or derived from seismic data. Examples of seismic attributes can include measured time, amplitude, frequency, attenuation, or computed amplitude versus offset ("AVO").

Seismic classification uses relationships between two volumes of input seismic attributes, for example, computed AVO intercept and gradient volumes, to create an output volume consisting of classification values. These classifications may allow the attributes in the output volume to be associated with a certain type of subsurface structure or lithology, such as sand or shale, and the type of fluid in a reservoir. Typically, the relationships may be specified by defining a polygon area in a cross plot of the two attributes. Conventional methods assign a constant value to each sample in the output classification volume for which the corresponding input pair of attribute samples maps to a cross plot location within the bounds of a particular polygon. Commercial volume classification tools may be divided into 3 groups. The first group involves assigning constant classified values. This technique is used in Well Seismic Fusion™, available from Landmark Graphics Corporation. The second group is typically limited to specific AVO attributes and fixed polygon shape templates. This technique is used by Well Seismic Fusion™ ABAVO plugins, available from ConocoPhillips, and AVO Crossplot, available from Headwave. The third group involves using a linear trend with bandwidth. This technique is used by Probe Paintbrush, available from Paradigm Corporation.

Conventionally, seismic classifications of two seismic attribute volumes involves assigning a constant value to each sample of the output classification volume that fall within the bounds of an individual polygon. This does not allow a seismic engineer to appreciate variations in the output data that may provide a more accurate understanding of the true subsurface conditions. Therefore, what is needed are methods and systems to create gradational classification values capturing the uncertainty or intensity of classification results. What is also needed are methods and systems that reveal subtle structural and stratigraphic features, lithography and fluids in the reservoir by applying more robust scaling method to overcome the existing limitations of volume classification

SUMMARY OF THE INVENTION

In an embodiment, a method for classifying seismic attributes is provided that includes generating data points by cross plotting seismic attributes from a first data volume and a second data volume, encompassing at least one of the generated data points within a polygon, generating a reference line, determining an interpolation direction relative to the reference line, and assigning an attribute value to the at least one generated data point encompassed within the polygon wherein the assigned attribute value is interpolated based on its distance to the reference line along the interpolation direction.

DETAILED DESCRIPTION OF DISCLOSED EMBODIMENTS

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Embodiments of the invention provide a volume classification for seismic analysis. Some embodiments are particularly useful for prestack interpretations, which are often important in deepwater plays such as Brazil's subsalt carbonates where analysis of prestack seismic attributes can reveal subsalt fracture patterns not evident in standard poststack data. Embodiments of the invention allow gradational classification values to be assigned, where the classification value depends on the polygon that an attribute data pair falls into, a scaling range assigned to the polygon, one or two reference lines which may be linear or non-linear, and a direction of interpolation. In at least some embodiments, a disclosed seismic imaging system includes software that configures one or more processors to perform the following operations.

Figure 1:
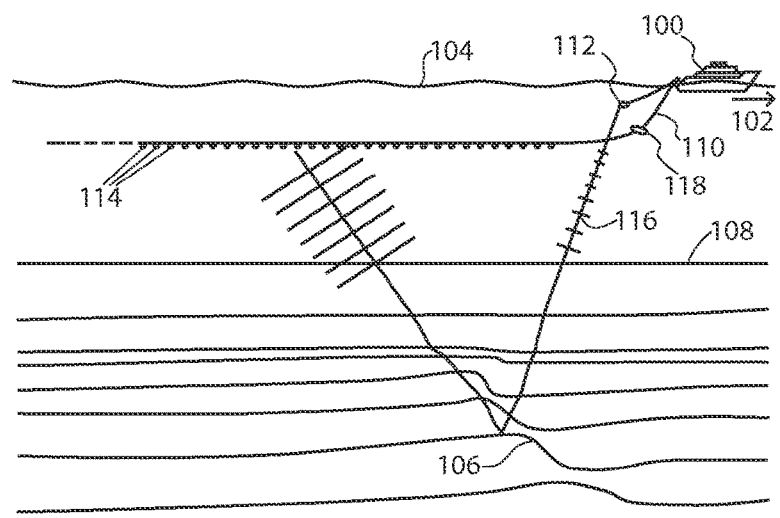
FIG. 1 shows a side view of an illustrative marine seismic survey environment.
Figure 2:
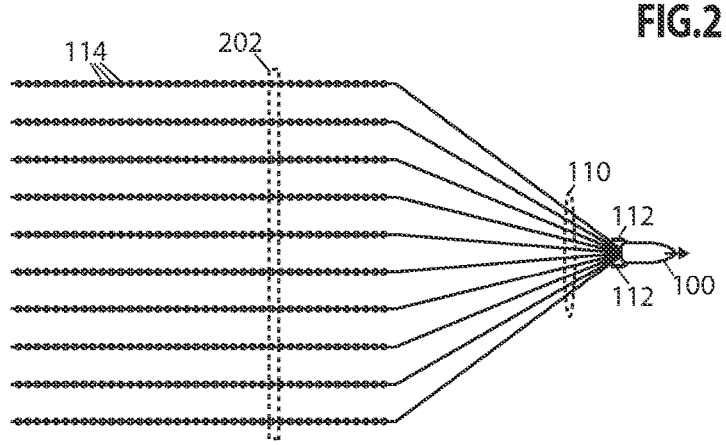
FIG. 2 shows a top view of an illustrative marine seismic survey environment.

These and other inventive aspects of the present disclosure are best understood in an illustrative context such as a marine seismic survey such as that shown in FIGS. 1-2. At sea, seismic survey ships deploy streamers behind the ship as shown in FIG. 1. Each streamer 110 trails behind the ship 100 as the ship moves forward (in the direction of arrow 102), and each streamer includes multiple evenly-spaced receivers 114. Each streamer 110 may further include a programmable diverter 118 and programmable depth controllers that pull the streamer out to an operating offset distance from the ship's path (see FIG. 2) and down to a desired operating depth (FIG. 1). FIG. 2 shows an overhead view of the seismic survey ship 100 towing a set of streamers 110 and two sources 112. As the ship 100 moves forward, the sources can be triggered alternately in a so-called flip-flop pattern. The receivers at a given position on the streamers are associated with a common field file trace number or common channel 202. Streamers 110 may be up to several kilometers long, and are usually constructed in sections 25 to 100 meters in length that include groups of up to 35 or more uniformly spaced receivers. Each streamer 110 includes electrical or fiber-optic cabling for interconnecting receivers 114 and the seismic equipment on ship 100. Data is digitized near the receivers 114 and transmitted to the ship 100 through the cabling at rates of 7 (or more) million bits of data per second.

As shown in FIG. 1, seismic survey ship 100 can also tow one or more sources 112. Source 112 may be an impulse source or a vibratory source. The receivers 114 used in marine seismology are commonly referred to as hydrophones, and are usually constructed using a piezoelectric transducer. Various suitable types of hydrophones are available such as disk hydrophones and cylindrical hydrophones. Sources 112 and receivers 114 typically deploy below the ocean's surface 104. Processing equipment aboard the ship controls the operation of the sources and receivers and records the acquired data.

Seismic surveys provide data for imaging below the ocean surface 104 to reveal subsurface structures such as structure 106, which lies below the ocean floor 108. Analysts employ seismic imaging methods to process the data and map the topography of the subsurface layers. Seismic survey data also reveals various other characteristics of the subsurface layers which can be used to determine the locations of oil and/or gas reservoirs. To image the subsurface structure 106, source 112 emits seismic waves 116 that are reflected where there are changes in acoustic impedance due to subsurface structure 106 (and other subsurface reflectors). The reflected waves are detected by a pattern of receivers 114. By recording (as a function of time) the arriving seismic waves 116 that have traveled from source 112 to subsurface structure 106 to receivers 114, an image of subsurface structure 106 can be obtained after appropriate data processing. Of course, it will be understood by those of skill in the art that even though embodiments are described in connection with offshore seismic technology, other embodiments are useful with on-shore, ocean bottom or other seismic survey arrangements.

The workflow that a user would follow to generate a volume of lithology/fluid classification values begins with analyzing well log data and seismic data in reservoir and non-reservoir zones to try and understand how various data attributes can help identify lithology (rock type and porosity) and fluid type in an area. For example, a cross plot of acoustic impedance vs. gradient impedance from well log curve data over various depth ranges and reservoir and non-reservoir zones may show separation of lithology/fluid types.

Figure 10:
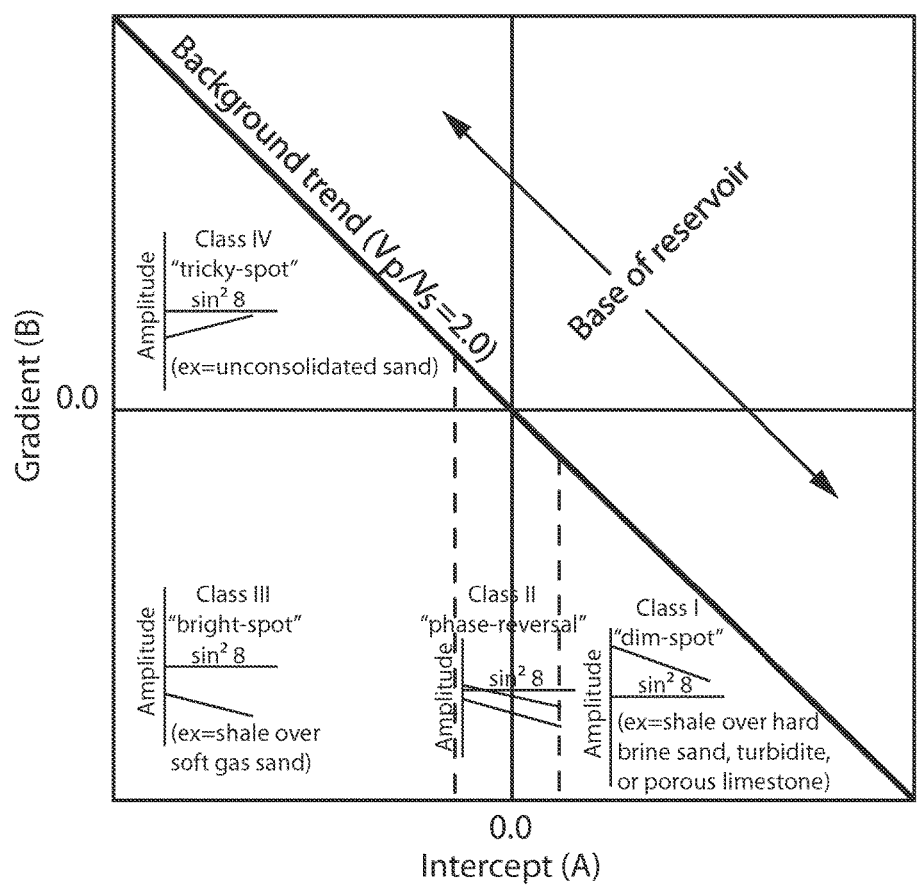
FIG. 10 shows a seismic template useful according to an embodiment of the invention.

A user often desires to compute similar attributes from a seismic volume because seismic attributes may be correlated to the different lithographies and fluids over the relatively large area of a seismic survey, especially regions between well locations. Pairs of attribute types can be interpreted in a cross plot using a known template such as the one shown in FIG. 10 that relates AVO intercept and gradient for different classes of rocks. Other templates may be used depending on the lithographic conditions.

The template may be calibrated to the seismic data in an area in order to find the angle of the "background trend" for non-reservoir rocks and to see whether or not fluids can be identified. For example, attribute points associated with different reservoir fluids may form distinct patterns in the cross plot. Generally, the further away from the background trend that attribute pairs plot, the more likely that they correspond to a hydrocarbon zone.

The user then cross plots pairs of seismic attributes in order to identify background trend(s) and anomalous areas away from the background trend that appear to correlate to known or prospective reservoir zones.

Next, the user then draws polygons around the interesting areas on the attributes cross plot. This is performed by interacting with the computer display of the crossplot using a mouse or similar data input device.

A polygon-classified volume is then generated from the attribute volumes. If an attribute data pair (one value from each of the input attribute volume, at the same x-y-z location) falls within the area of a polygon a value is assigned to the corresponding x-y-z location in the output volume of classification values. If an attribute data pair falls outside of all defined polygon relationships, then it may be assigned a value of zero, for example, in the corresponding sample in the output volume.

The user may then view the volume of classification values in a 3-d viewer and/or in vertical or horizontal slices (or horizon slices) to look for prospective reservoir zones throughout an area. Classification of seismic attributes can also be used as "quick look" technique that allows the interpreter to scan through a seismic volume to find locations that have attributes falling within an anomalous area of attribute space identified on a cross plot of two attributes, without necessarily performing extensive and time consuming analysis up-front to try to understand what the anomalous attribute area means.

One embodiment of the invention provides gradational classification values, rather than constant values, assigned to attribute pairs that fall within a given classification polygon. A range of values is assigned to be used in each polygon, e.g. 10 to 20 for one polygon, 30 to 40 for another, and so forth for each polygon created.

In an embodiment, the reference line will often correspond to a background trend, as in the intercept-gradient template shown but those of skill in the art will understand that other templates for interpreting attributes in a cross plot and other attribute types may be used as desired.

In one embodiment, the interpolation is based on the perpendicular distance from the reference line to the nearest polygon vertex, to the farthest polygon vertex, and to the position of each attribute pair falling within a polygon. In effect, the linear interpolation is between two parallel lines that touch the near and far vertices of the polygon, where the classification value at any point in the polygon is calculated based on the minimum and maximum scale values (assigned to the two parallel lines) and the relative position of the point between the parallel lines. In this embodiment, the reference line provides direction and the "near" and "far" vertices. In other embodiments, the reference line may run through the polygon, but it will still be used to define the "near" and "far" vertices and the interpolation direction.

In another embodiment, the reference line is not a straight line. In this case, a direction of interpolation must also be provided by the user since there is no simple perpendicular direction to follow. In this embodiment, the reference line is slid parallel to itself along the interpolation direction until it just touches the nearest point on the polygon (not necessarily a vertex) and another copy that just touches the farthest point of the polygon. These two non-linear lines are assigned the min and max scale values for the polygon and the classification value calculated at the position of any point (attribute pair) falling within the polygon is based on relative position (along the interpolation direction) between the two scaling lines.

In another embodiment, two different non-linear scaling lines are used to calculate the classification value at each point falling within the polygon. These scaling lines may coincide with the near and far sides of the polygon relative to a straight reference line. The direction of interpolation for calculating the classification values is perpendicular to the given reference line.

Figure 3:
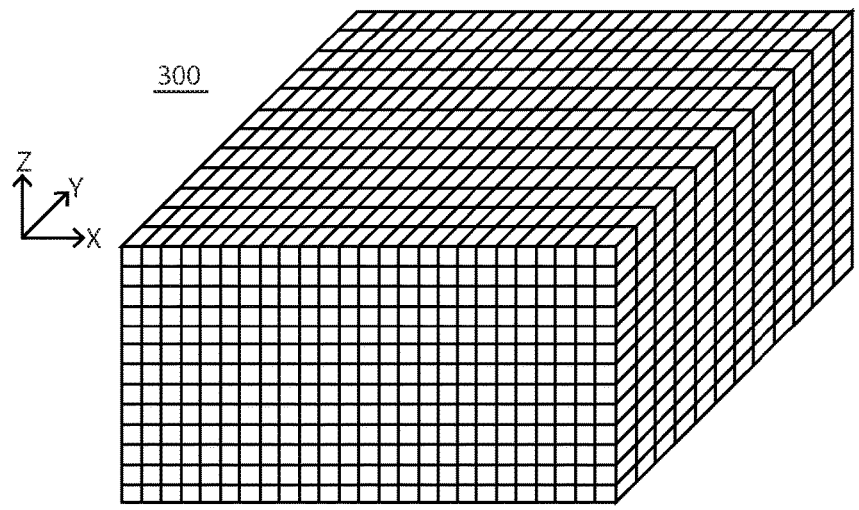
FIG. 3 shows an illustrative data volume in three dimensions.

Referring now to FIG. 3, data from the seismic sensors is processed to create a data volume, i.e., a three dimensional array of data values such as that shown in FIG. 3. The data volume 300 in FIG. 3 represents some seismic attribute throughout the survey region. The three-dimensional array comprises uniformly-sized cells, each cell having a data value representing the seismic attribute for that cell. Examples of suitable seismic attributes include reflectivity, acoustic impedance, acoustic velocity, and density. The volumetric data format more readily lends itself to computational analysis and visual rendering, and for this reason, the data volume may be termed a "three-dimensional image" of the survey region.

Each of the volume data points may contain one or more values that describe a particular portion of the data volume 300. For example, each of the volume data points may contain x, y, z coordinates that specify the location of a portion of the data volume 300. Each of the volume data points may further contain data values corresponding to a specific property, such as density, velocity or some other property.

Analyzing the data contained in the volumes is advantageously performed using a crossplot. A crossplot is a user-defined plot that allows a user to plot on a computer display both the X and Y axis with a specific parameter. Crossplots are useful, for example, to examine the relationship between two attributes from two different volumes. For each point in the crossplot, two coordinates (X and Y) correspond to specific values of the two attributes. If the two attributes are related, the data points may form a shape such as a straight line or a distinct curve on the computer display. If the attributes are not related, the points form an amorphous cloud. This allows a user to quickly analyze the relationship between two or three variables. In one embodiment, the user may color the plotted points using a third attribute (the Z-axis attribute) with values of this attribute scaled to and a specified color map.

In embodiments of the invention, seismic classification may be performed using the entire data from a plurality of volumes, or subsets of data from the volumes may be used. Using subsets decreases the amount of computer processing required and allows faster analysis of the data. After a relationship between a set of attributes is found, then the entire data volumes may be searched for attributes with the same or similar relationship. Subsets of attributes may be created by drawing boxes or polygons around groups of data points in a crossplot, for example, by using a mouse or similar computer pointer to identify vertices of the polygon on the computer display of the crossplot.

An output classification volume may then be created from the points within the polygon. An output classification volume is a data volume where each point in the volume has an X-, Y-, and Z-coordinate corresponding to the points in the data volumes used to create the crossplot. However, the attributes associated with the points in the output classification volume are defined according to embodiments of the invention. In one implementation, the points within the parameter defined by the polygon are assigned an arbitrary numerical value. The complete data volumes, or, if desired, a subset of the data volumes, are then searched for other instances where the attributes in the volumes share the same relationship to each other as the attributes that define the points within the polygon. When a pair, or a set, of such attributes is found, the corresponding point in the output classification volume is assigned the same numerical value. All other attributes in the output classification are assigned a different numerical value.

A polygonal surface may be wholly or partially contained in the data volume 300. The polygonal surface may be a two- or three-dimensional surface that is chosen or specified by a user or by a computer. The polygonal surface may be chosen to enable a user to examine the volume data points that intersect the polygonal surface. The polygonal surface may be chosen in order to model a naturally occurring surface. Various methods for describing each polygon are possible. For example, a polygon may be defined by a set of vertices and edges. The polygons may be either user or computer specified.

Figure 4:
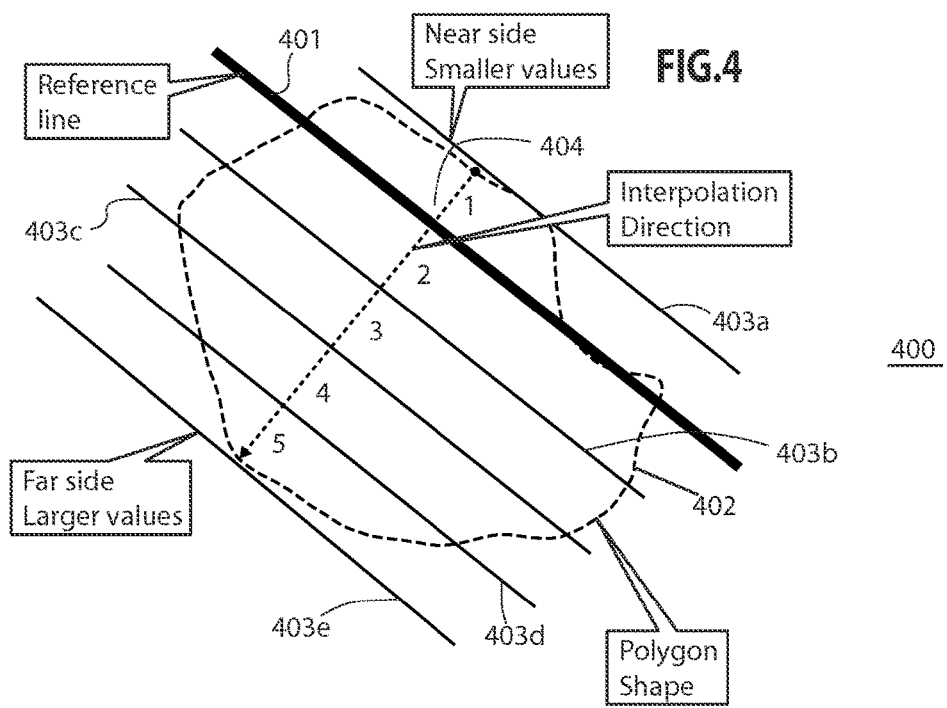
FIG. 4 shows an illustrative crossplot according to an embodiment.

In one embodiment, a method is provided to calculate gradational classification values. FIG. 4 illustrates an embodiment using a user defined linear reference line 401 which passes through polygon 402. FIG. 4 shows a crossplot 400 which, in this case, is created by cross plotting data attributes from two data volumes against each other. It will be understood that an actual computer display of the crossplot 400 would show the individual points obtained by cross plotting the attributes in the volumes being compared. These individual points are not shown, however, for purposes of clarity. A user sets a set of points for analysis by creating polygon 402 on the crossplot display. In other embodiments, multiple polygons could be created on a single crossplot display. Polygon 402 in this embodiment may be specified by the user interacting with a display screen showing a two-dimensional section of the data volume.

It will be appreciated that not all the points within polygon 402 are necessarily of equal interest. Though all may share a relationship indicating a particular subsurface feature, such as sand or wet shale, the relationship may be stronger in certain regions of the polygon 402. Rather than assign the same numerical value to each attribute in the output classification volume, embodiments of the invention provide a gradational classification output volume.

In one embodiment, the user defines reference line 401 by, for example, interacting with the computer display of the crossplot 400 using a mouse or similar data entry device. In the embodiment shown, reference line 401 overlaps polygon 402. In other embodiments, the reference line may lie outside the polygon 402.

In one embodiment, the classification value at each data point falling within the polygon 402 is linearly interpolated between a minimum scale value assigned to a line parallel to the reference line and touching the near side of the polygon (with respect to the reference line) and a maximum scale value assigned to another line parallel to the reference line and touching the far side of the polygon. In the particular embodiment shown in FIG. 4, the reference line touching the near side of polygon 402 is line 403a, while the lines touching the far side of polygon 402 is line 403e. Lines of constant gradational value within any polygon lie parallel to the reference line, as indicated by lines 401a-403e. The direction of interpolation is perpendicular to reference line 401 as shown by directional line 404.

In the embodiment, an infinite number of values are allowed for the calculated classification value. An exact classification value may be calculated at the position of each point (attribute pair) inside a polygon region, both when running the algorithm on a subset of the volume and viewing the calculated values as colored z-axis values in the cross plot during the polygon calibration step and when running the algorithm on the full attribute volumes to create the output volume of classification values. The intermediate lines drawn between the scaling lines in FIG. 4 indicate the directional pattern of calibration values a user would expect to observe when the calibration values are displayed as colored cross plot z-values using some range of colors between the minimum scaling value and the maximum scaling value for the polygon. The intermediate lines are not intended to suggest any constraints on the values and are not required in the calculation of classification values. The calculated values in this embodiment do not depend on actual distance from the reference line. The calculated value at each point depends on the minimum and maximum scale values assigned to the polygon and on the relative position of the point between two scaling lines that touch the extreme sides of the polygon, with linear interpolation between the two scale values performed at the point, along a defined direction between the two scaling lines. The scaling lines may or may not be straight lines and may or may not parallel each other.

Figure 5:
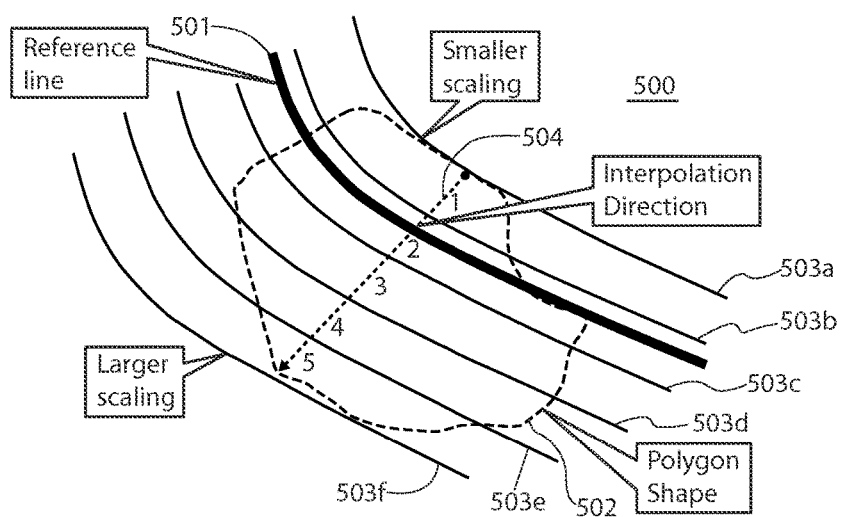
FIG. 5 shows an illustrative crossplot according to an embodiment.

Another embodiment of the invention is shown in FIG. 5. In this embodiment, the reference line 501 is non-linear and overlaps polygon 502. Constant gradational lines 503a-503f are parallel to reference line 501. The outer constant gradational lines 503a and 503f touch the boundaries of polygon 502 and thus set the minimum and maximum scaling for the points within polygon 502.

The interpolation direction, illustrated by line 504, determines how the reference line is projected in order to find non-linear scaling lines that touch the near and far sides of the polygon.

In embodiments in which the reference line is straight, the interpolation direction may be taken to be perpendicular to it. In embodiments in which the reference line is non-linear, then an interpolation direction may be specified by the user, for example, by creating an interpolation line on the crossplot using a mouse or similar input device. It will also be appreciated that in the embodiment depicted in FIG. 4, a single interpolation direction line is intended to show direction only, not position. In one implementation, the calculation uses a different interpolation line for each point, with each point in the polygon having an interpolation line that intersects the point and follows the specified direction According to this embodiment, at each data point within the polygon 502, a classification value is interpolated, along the direction of interpolation, between these non-linear scale lines 503a and 503f. As a result, lines of constant classification value within any polygon mimic the shape of the reference line.

Figure 6:
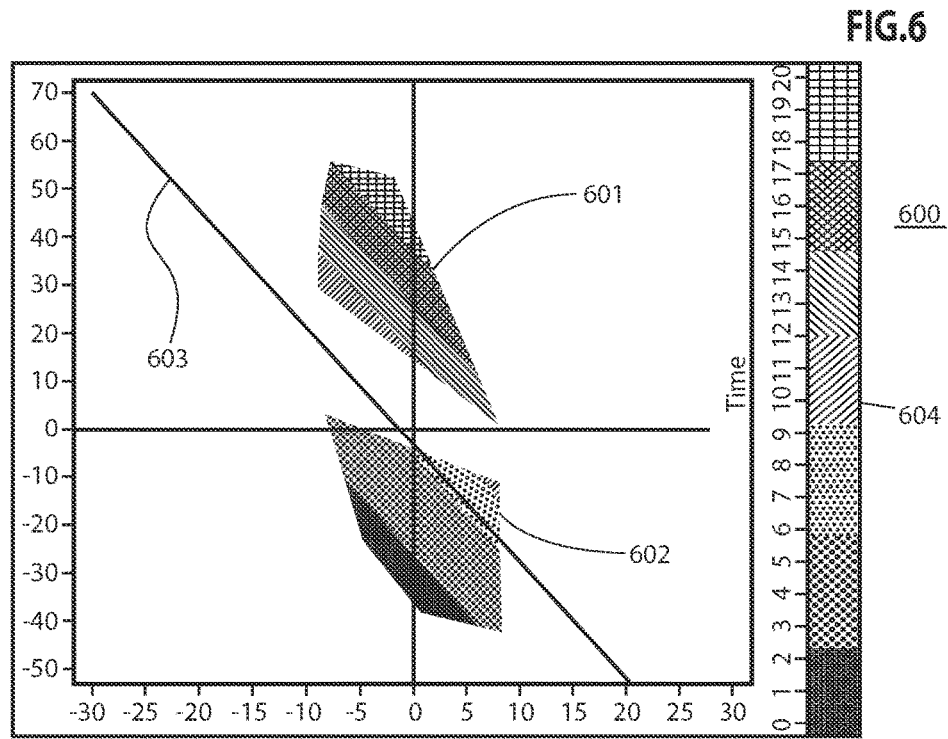
FIG. 6 shows an illustrative crossplot according to an embodiment.

In an embodiment, the calculated gradational classification values may be displayed as colored Z-axis values in a crossplot of the two seismic attributes. FIG. 6 shows an example of a crossplot as displayed on a computer screen. The data points derived by cross plotting the attributes from two data volumes are illustrated as crosses in the crossplot display. The Y-axis are attributes from the data volume containing gradient information. The X-axis are attributes from the data volume containing intercepts. In this embodiment, the data being crossplotted reflect AVO intercept and gradient attribute volumes. The classification values have been calculated by linear interpolation between two scaling lines parallel to a linear reference line that intersects the polygon vertices that are farthest from the reference line.

In this embodiment, two polygons 601, 602 encompass selected data points. Linear reference line 603 is drawn to establish the interpolation direction, which is perpendicular to the reference line. In this example, reference line 603 overlaps polygon 602, but not polygon 601. The polygons and reference lines may be created by user interaction with the computer display using, for example, a mouse to indicate vertices or points on the line. Creation of the reference line and polygons may be based on the user's skill, training and knowledge. For example, certain relationships between seismic attributes may indicate the existence of a particular subsurface feature, and this may be known from experience with other wells in the area. A user wishing to locate similar features could then select polygons containing points that share the same seismic attribute relationship. The reference line may then follow a trend in the data points where the relationship is the strongest. The data points in the polygon closest to the reference line may be of the greatest interest.

Figure 7:
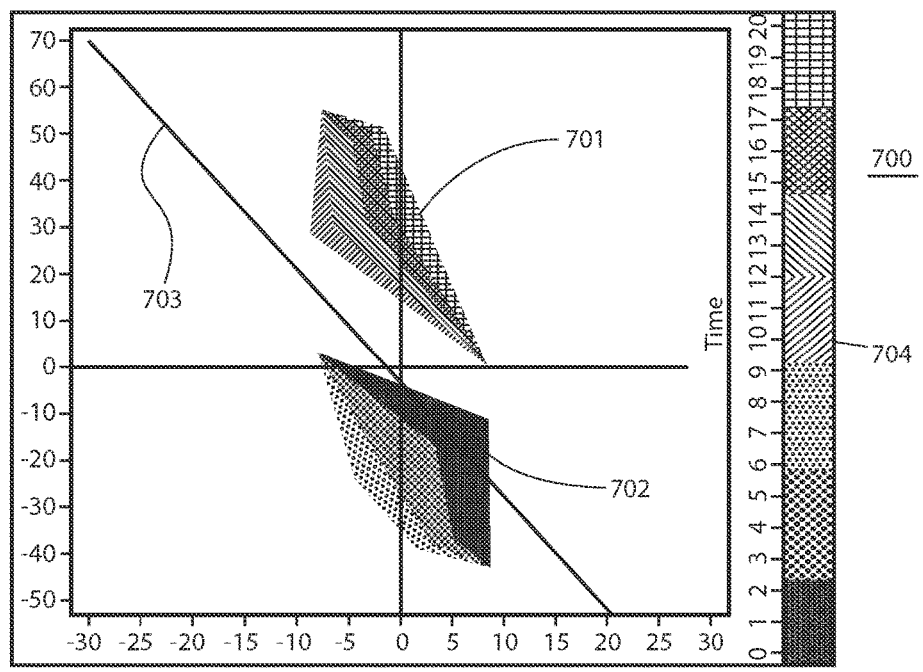
FIG. 7 shows an illustrative crossplot according to an embodiment.

In the crossplot shown in the embodiment of FIG. 7, the Z-axis values of the data volumes. In some implementations, the Z-axis values represent the time or depth corresponding to the attributes being plotted, and may be indicated by assigning a color to the data point. In the embodiment shown in FIG. 6, the color map is shown on the scale 604 on the right side of the crossplot display. It will be appreciated that although the color in the FIGS. 6-7 is indicated by a gray-scale shading, in actual embodiments a color display may be presented to the user, for instance, on a color computer monitor or print out. In one embodiment, the color scale may vary from a deep violet at classification values of less than one to a light yellow at values greater than 19. This color scale is applied to the data points to provide the user with a visual indication of their Z-axis value. This allows the user to preview the gradational effect of classification values calculated on a small subset of seismic attribute values before running the classification algorithm on the full attribute volumes.

It will be understood that the cross plot z-values are not limited to the spatial z-values that correspond to a subsurface depth or seismic recording time in the data volume. While it is often useful to display the spatial Z-axis value according to a color scale in the crossplot, those of skill in the art will appreciate that any third attribute associated with the data points that can be displayed in a 2D cross plot by using a scaled color. This attribute can be the z-value position of data samples in a seismic volume, but can just as easily be any other attribute. In the embodiments shown in FIGS. 6-7 the gradational scaling cross plot view the cross plot z-axis values are the calculated classification values. The lower half of the color bar represents calculated classification values between 0 and 10, assigned to the upper polygon, and the upper half of the color bar is used for classification values between 10 and 20, assigned to the lower polygon. Using the colored cross plot z axis to show calculated classification values allows the interpreter to see the pattern of calculated values at a glance.

FIG. 7 shows a crossplot 700 according to another embodiment of the invention. In this embodiment, the shape of the polygons 701, 702 determine the non-linear scaling lines that are used to interpolate a classification value at each data point falling within the polygon. In this embodiment, a linear reference line 703 is first used to find the near and far sides of the polygons 701, 702, with respect to the line. In this embodiment, the near side of the polygon is assigned the minimum value for that polygon, and the far side is assigned the maximum value for the polygon. With respect to polygon 701, the near side is assigned the value "10" and the far side is assigned the value "20." For polygon 702, the near side is assigned the value "0", and the far side "10." As a result, lines of constant classification values within any polygon appear to be semi-contoured, converging to the points at which the near and far sides of the polygon meet as shown in FIG. 7.

Figure 8:
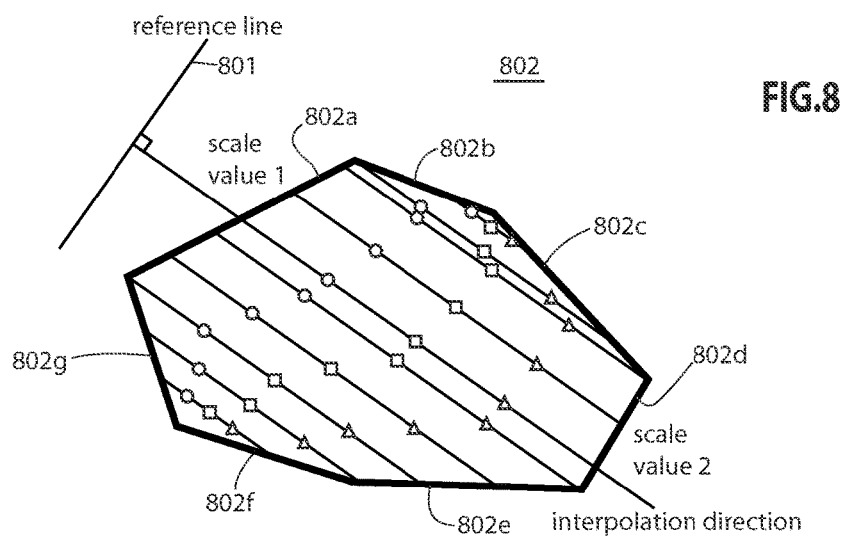
FIG. 8 illustrates an embodiment of the invention using a linear reference line.

Referring now to the embodiment shown in FIG. 8, the reference line 801 is used to provide interpolation direction perpendicular to the reference line and as a way to determine the near and far sides of the polygon 802. The near and far sides of the polygon, are themselves the two scaling lines that are assigned either the minimum or maximum scaling values for the polygon. Polygon 802 comprises line segments 802a-802g. The near side comprises line segments 802a, 802b, and 802g. The far side comprises segments 802c, 802d, 802e, and 802f. All points on the near side are assigned a classification value, while the points on the far side are assigned a different classification value. The values are constant along each of the near and far sides (assigned min and max scaling values, respectively). Values at points inside the polygon are interpolated in a direction perpendicular to the reference line (illustrated by the parallel lines inside the polygon 802) using the relative position of the point between the two non-linear scaling lines (that coincide with the sides of the polygon) to find an interpolated classification value at the point. For example, in FIG. 8, if "scale value 1" is equal to 10 and "scale value 2" to 20, then all of the points illustrated by the square point symbols (located at 25% of the distance from the near to far sides) have a classification value of 12.5; all of the points indicated by triangle point symbols (located midway between the two sides) have a value of 15; and all of the points illustrated by circular point symbols (located at 75% of the distance from the near to far sides) have a value of 17.5.

According to an embodiment, the method identifies the near and far sides of the polygon 802 by calculating near and far intersection points of a line perpendicular to the reference line 801 through each point inside the polygon 802 (depicted by perpendicular lines internal to the polygon 802 in FIG. 8). In this embodiment, at each data point, an algorithm constructs an interpolation line that intersects the data point and is perpendicular to reference line. It then finds the nearest intersection of the interpolation line with any segment of the polygon and the farthest intersection of the interpolation line with any segment of the polygon, where the "nearest" and "farthest" are based on distances of polygon intersections from the reference line. The point at the nearest polygon intersection is assigned a scale value, for example 1 (typically the smaller of the two scale values) and the farthest point is assigned scale value, for example 2. The line of interpolation at each data point, therefore, passes through all three points—the data point and the two intersections with the polygon—and a linearly interpolated classification value may be determined at the data point, where the value depends on the relative position of the data point between the two intersection points on the boundaries of the polygon 802.

In an embodiment, the collection of "near" intersection points calculated for all data points falls along connected polygon segments that can then be called the near side of the polygon, and the collection of "far" intersection points falls along polygon segments that can be called the far side of the polygon.

After assigning the data points in the polygon their interpolated values, an output classification volume is then created. The output classification volume according to embodiments of the invention has the same data format as the data volume described with respect to FIG. 3, with each point having an X-, Y-, and Z-coordinate that corresponds to the coordinates in the cross plotted data points. The attribute value associated with each data point in the output classification volume is either the interpolated value corresponding to the data point, or, for data points outside of the polygons, a separately assigned numerical value.

Figure 9:
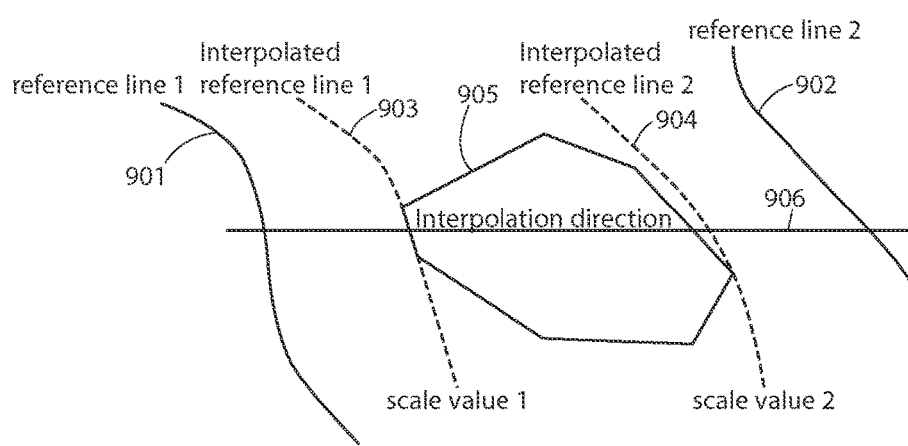
FIG. 9 illustrates an embodiment of the invention using a non-linear reference line.

FIG. 9 shows an embodiment of the invention in which non-linear reference lines 901 and 902 are used to interpolate non-linear, non-parallel reference lines 903 and 904 which touch the sides of polygon 905. The user then selects the interpolation direction, such as interpolation direction 906. The interpolated reference lines 903 and 904 may then be used to calculate interpolated classification values at points inside polygon 905.

In another embodiment, a method for classifying seismic attributes is provided that includes generating data points by cross plotting seismic attributes from a first data volume and a second data volume, encompassing at least one of the generated data points within a polygon, generating a reference line, determining an interpolation direction relative to the reference line, and assigning an attribute value to the at least one generated data point encompassed within the polygon wherein the assigned attribute value is interpolated based on its distance to the reference line along the interpolation direction. It will be appreciated that "polygon" is intended to include any shape that serves to encompass data points in the crossplot, including square, circular, or oval, even if such a shape would not be considered a polygon in the strictest sense of the term.

Another embodiment of the invention provides a system for seismic classification. The system may include one or more computers and one or more storage devices storing instructions that are operable, when executed by the one or more computers, to cause the one or more computers to perform operations including generating data points by cross plotting seismic attributes from a first data volume and a second data volume, encompassing at least one of the generated data points within a polygon, generating a reference line, determining an interpolation direction relative to the reference line, and assigning an attribute value to the at least one generated data point encompassed within the polygon wherein the assigned attribute value is interpolated based on its distance to the reference line along the interpolation direction.

Yet another embodiment provides a computer-readable storage medium that provides instructions, which when executed by one or more processors, cause said set of processors to perform operations comprising generating data points by cross plotting seismic attributes from a first data volume and a second data volume and encompassing at least one of the generated data points within a polygon. The instructions further cause the processors to perform operations comprising generating a reference line, determining an interpolation direction relative to the reference line; and assigning an attribute value to the at least one generated data point encompassed within the polygon wherein the assigned attribute value is determined by interpolation based on the combination of its position to the reference line along the interpolation direction and the shape of the polygon.

It will be understood that the system may be implemented on a variety of suitable computer equipment and may be implemented as software algorithms or modules to cooperate with other software, such as Well Seismic Fusion™ available from Landmark Graphics Corporation. In one implementation, a suitable computer system includes and operating system, such as RedHat Linux Enterprise or Windows 7 running a on processor such as an Intel compatible 64-bit dual processor at 2 GHz or faster. The system may also include computer memory, such as 8 or 16 GB of random access memory (RAM) and hard disk storage space, for example 10 GB or more for prestack information. The system also includes a display to allow the user to view the data points and create features such as the polygons and reference lines, for example a plurality of monitors having a resolution of 1280×1024 pixels. The system also may include a suitable graphics card, such as an nVidia Quadro FX series or similar. The system also includes a suitable user interactive devices, such as a keyboard, mouse or similar.

It will be appreciated by those of skill in the art that by applying the disclosed combination of user-defined reference lines, interpolation directions, and freeform polygon shapes to generate a gradational classification volume, embodiments of the invention enable the user to quantitatively assess reservoir lithology and fluid variation with much greater confidence and flexibility. As a result, the interpreter can apply a consistent volume classification technique to various types of seismic attributes, for example, attributes extracted from basic migrated seismic data to advanced attributes such as those extracted from prestack seismic data and seismic inversion products, as well as reservoir property prediction products. Therefore, it will be understood that embodiments disclosed herein provide a unique new approach to compute gradational classification values capturing the uncertainty or intensity of classification results.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claimed invention, which is set forth in the following claims.

What is claimed is:

1. A method for classifying seismic attributes comprising:
generating a seismic signal by at least one seismic source located below the surface of the earth or below water surface;
receiving the seismic signal by a plurality of horizontally spaced apart seismic receivers located below the surface of the earth or below the water surface;
generating a first data volume and a second data volume by processing data received by the plurality of seismic receivers;
generating data points by cross plotting seismic attributes from the first data volume and the second data volume to identify one or more background trends and one or more anomalous areas spaced apart from the one or more background trends, wherein the one or more anomalous areas correlate to one or more known or prospective reservoir zones;
encompassing at least one of the generated data points within a polygon;
generating a reference line;
determining an interpolation direction relative to the reference line;
assigning an attribute value to the at least one generated data point encompassed within the polygon wherein the assigned attribute value is determined by interpolation based on the combination of its position to the reference line along the interpolation direction and the shape of the polygon.

2. The method according to claim 1, further comprising assigning the polygon a range of classification values at the near-side and far-side of the polygon based on its distance to the reference line.

3. The method according to claim 2, further comprising generating a far-side constant gradation line parallel to the reference line and touching the far side of the polygon wherein the far-side constant gradation line is assigned a far-side constant classification value.

4. The method according to claim 3, further comprising generating a near-side gradation line parallel to the reference line and touching the near-side of the polygon wherein the near-side constant gradation line is assigned a near-side constant classification value.

5. The method according to claim 4, wherein the assigned attribute value is determined by linear interpolation with respect to the far-side constant classification value and the near-side constant classification value.

6. The method according to claim 1, further comprising displaying the data points, polygon, and reference line on a computer display wherein Z-axis information in the data volumes is displayed within the polygons according to a color scale.

7. The method according to claim 1, further comprising generating an output classification volume having a first plurality of assigned attributes generated from data points encompassed within the polygon and interpolated based on their distance to the near-side and far-side of the polygon along the interpolation direction, and a second plurality of assigned attributes having a constant value and being associated with data points outside of a polygon.

8. A non-transitory computer-readable storage medium that provides instructions, which when executed by one or more processors, cause said set of processors to perform operations comprising:
generating a seismic signal by at least one seismic source located below the surface of the earth or below water surface;
receiving the seismic signal by a plurality of horizontally spaced apart seismic receivers located below the surface of the earth or below the water surface;

generating a first data volume and a second data volume by processing data received by the plurality of seismic receivers;

generating data points by cross plotting seismic attributes from the first data volume and the second data volume;

encompassing at least one of the generated data points within a polygon;

generating a reference line;

determining an interpolation direction relative to the reference line;

assigning an attribute value to the at least one generated data point encompassed within the polygon wherein the assigned attribute value is determined by interpolation based on the combination of its position to the reference line along the interpolation direction and the shape of the polygon.

9. The computer-readable storage medium according to claim 8, wherein the operations further comprise assigning the polygon a range of classification values at the near-side and far-side of the polygon based on its distance to the reference line.

10. The computer-readable storage medium according to claim 9, wherein the operations further comprise generating a far-side constant gradation line parallel to the reference line and touching the far side of the polygon wherein the far-side constant gradation line is assigned a far-side constant classification value.

11. The computer-readable storage medium according to claim 10, wherein the operations further comprise generating a near-side gradation line parallel to the reference line and touching the near side of the polygon wherein the near-side constant gradation line is assigned a near-side constant classification value.

12. The computer-readable storage medium according to claim 11, wherein the assigned attribute value is determined by linear interpolation with respect to the far-side constant classification value and the near-side constant classification value.

13. The computer-readable storage medium according to claim 8, wherein the operations further comprise displaying the data points, polygon, and reference line on a computer display wherein Z-axis information in the data volumes is displayed within the polygons according to a color scale.

14. The computer-readable storage medium according to claim 8, wherein the operations further comprise generating an output classification volume having a first plurality of assigned attributes generated from data points encompassed within the polygon and interpolated based on their distance to the near-side and far-side of the polygon along the interpolation direction, and a second plurality of assigned attributes having a constant value and being associated with data points outside of a polygon.

15. A system comprising:

one or more computers and one or more storage devices storing instructions that are operable, when executed by the one or more computers, to cause the one or more computers to perform operations comprising:

generating a seismic signal by at least one seismic source located below the surface of the earth or below water surface;

receiving the seismic signal by a plurality of horizontally spaced apart seismic receivers located below the surface of the earth or below the water surface;

generating a first data volume and a second data volume by processing data received by the plurality of seismic receivers;

generating data points by cross plotting seismic attributes from the first data volume and the second data volume;

encompassing at least one of the generated data points within a polygon;

generating a reference line;

determining an interpolation direction relative to the reference line;

assigning an attribute value to the at least one generated data point encompassed within the polygon wherein the assigned attribute value is determined by interpolation based on the combination of its position to the reference line along the interpolation direction and the shape of the polygon.

16. The system according to claim 15, wherein the operations further comprise assigning the polygon a range of classification values at the near-side and far-side of the polygon based on its distance to the reference line.

17. The system according to claim 15, wherein the operations further comprise generating an output classification volume having a first plurality of assigned attributes generated from data points encompassed within the polygon and interpolated based on their distance to the near-side and far-side of the polygon along the interpolation direction, and a second plurality of assigned attributes having a constant value and being associated with data points outside of a polygon.

18. The system according to claim 15, wherein the assigned attribute value is determined by linear interpolation with respect to the far-side constant classification value and the near-side constant classification value.

* * * * *